Patented Jan. 28, 1941

2,229,992

UNITED STATES PATENT OFFICE 2,229,992

ANTIMONY OLEATE

Hans Schmidt, Wuppertal-Vohwinkel, Germany, assignor to Winthrop Chemical Company, Inc., New York, N. Y., a corporation of New York No Drawing. Application June 19, 1937, Serial No. 149,099. In Germany June 26, 1936

3 Claims. (Cl. 260—414)

This invention relates to a process for preparing antimony oleates.

Antimony compounds of various composition, which compounds are soluble in water, are used in therapy for the treatment of tropical diseases such as bilharciosis, opisthorchiasis, clonorchiasis, filariosis. The known antimony compounds of this kind display the disadvantage that they are insoluble in fatty oils. Oil-soluble medicaments are however of great value in therapy since, when administering oily solutions either orally or parenterally particularly advantageous therapeutic results are obtained.

I have now found that the antimony oleates which were up to the present unknown to the chemical science display favorable qualities in the treatment of tropical diseases and, compared with the known antimony compounds effective against these diseases, show the advantage to be in general soluble in fats and oils.

Antimony oleates may be obtained either by causing oleic acid to react with antimony oxides or by double decomposition of salts of oleic acid and salts of the antimony oxides with acids.

In the first case oleic acid is heated with antimony oxide to temperatures preferably above 100° C. In order to avoid any saponification of the antimony oleate obtained by the reaction the water formed should be removed. This is advantageously done by working under reduced pressure. In this case preferably no solvent is added. In order to facilitate the removal of the water the reaction mixture is preferably stirred.

When effecting a double decomposition between salts of the antimony oxides with acids and salts of oleic acid care must be taken to avoid the hydrolysing action of water. Accordingly the reaction must be carried out in a substantially anhydrous medium.

As salts of oleic acid primarily the alkali metal and amine salts which are easily accessible may be mentioned. There may be cited by way of example sodium-, potassium-, ammonium-oleate as well as the salts of oleic acid with mono-methyl amine, diethyl amine, diethanol amine or diphenyl amine. It is also possible to produce the amine salts of oleic acid in the reaction mixture by causing the anhydrous amino bases to react with the oleic acid without previously isolating the salts. Instead of the alkali metal and amine salts of oleic acid the alkaline earth metal salts, such as magnesium or calcium salts of oleic acid may also be employed.

As salts of the antimony oxides there come particularly into consideration the antimony halides, such as antimony trichloride or antimony tribromide.

The double decomposition is suitably performed in the presence of an anhydrous solvent. Practically anhydrous fats (oils), such as olive oil, sesame oil, peanut oil and poppy seed oil, as well as ether have proved especially suitable. Also other anhydrous solvents, for example ethanol, methanol, glycerol and benzene may be used.

As by the described reaction, products are in most cases formed which are insoluble in the solvent used, it is advisable to remove the insoluble ingredients, for example, by filtration. When causing antimony oxide to react with oleic acid the antimony oleate formed can be separated from the excess antimony oxide by extraction with practically anhydrous ether.

The antimony oleates especially those which are obtained by double decomposition of salts of oleic acid and salts of antimony oxides with acids in the presence of ether or a fatty oil are easily soluble in fatty oils and ether. They constitute a viscous oil without any definite freezing or boiling point. When treated with hydrogen sulfide, for instance hydrogen sulfide water, antimony sulfide is precipitated.

The invention is further illustrated by the following examples without being restricted thereto:

Example 1

30 g. of oleic acid are dissolved in ether, whereupon first a solution of 6.75 g. of antimony trichloride in ether and then a solution of 7 g. of diethylamine in ether are added while vigorously stirring.

After having stirred for some time the diethylamine hydrochloride separated is filtered off with suction. The ether is distilled off and its last residues are removed in vacuo. Antimony oleate remains as a viscous oil which can easily be mixed with fatty oils. All of the reagents used must be substantially free from water.

Instead of antimony chloride also a corresponding amount of antimony bromide may be used. The diethyl amine used as solvent may be replaced for instance by mono-ethylamine, dimethylamine, mono-, di- or triethanolamine.

Example 2

To a solution of 30 g. of oleic acid in 100 ccs. of olive oil a solution of 6.75 g. of antimony trichloride in a small quantity of ether and then a solution of 7 g. of diethylamine in a small quantity of olive oil are added while violently stirring. An elevation of temperature and separation of diethylamine hydrochloride occur. After stirring for a long time the separated hydrochloride is removed by filtration. For therapeutic application the antimony content may be determined in the filtrate and brought to the content desired by dilution with olive oil. In this manner, it is easy to obtain clear solutions which are stable on storage and which may contain 10, 20 and more mg. Sb per cc.

Instead of the olive oil other fatty oils, for example sesame oil, poppy seed oil and others, instead of the diethylamine other organic nitrogenous bases, for instance those mentioned in Example 1, may be used. Also the sequence of the additions of the reagents may differ widely. In the present case first the oily solution of the diethylamine and then the ethereal solution of the antimony trichloride can be added to a solution of the oleic acid in the oil. All of the reagents employed must be substantially free from water.

*Example 3*

100 ccs. of olive oil are poured into a flask of 250 ccs. capacity; then a solution of 6.75 g. of antimony trichloride dissolved in a small quantity of ether and 32 g. of sodium oleate are added. The flask is shaken or turned round during several days. Then the undissolved or separated substances are filtered off whereupon the filtrate may be brought to the required antimony content as described in Example 2. All of the reagents used must be substantially free from water.

Instead of 6.75 gs. of antimony trichloride another salt of antimony, for instance 10.5 gs. of antimony tribromide may be used.

*Example 4*

18 g. of oleic acid are made into a paste with 15 g. of antimony oxide. The mixture is heated for several hours in the oil bath to 130° C. under a pressure of 15 mm.

The formation of bubbles indicates that the reaction has begun. When the reaction is complete the reaction-mixture can be taken up with ether and filtered from the excess antimony oxide. After evaporation the filtrate leaves an oil which yields an abundant separation of antimony sulfide when shaken with hydrogen sulfide water.

The quantities of the antimony used, the temperature and the time of the reaction can be varied to a far reaching extent. It is also advisable to agitate the reaction mixture.

I claim:

1. The process for the preparation of antimony oleate which comprises reacting an antimony halide with a member selected from the group consisting of alkali metal-, and amine-salts of oleic acid in a substantially anhydrous solvent selected from the group consisting of an anhydrous vegetable oil and diethyl-ether.

2. The process for the preparation of antimony oleate which comprises reacting an antimony halide with the sodium salt of oleic acid in a substantially anhydrous solvent selected from the group consisting of an anhydrous vegetable oil and diethyl-ether.

3. The process for the preparation of antimony oleate which comprises reacting an antimony halide with the diethyl-amine salt of oleic acid in a substantially anhydrous solvent selected from the group consisting of an anhydrous vegetable oil and diethyl-ether.

HANS SCHMIDT.